United States Patent [19]
Bezos

[11] Patent Number: 5,808,370
[45] Date of Patent: Sep. 15, 1998

[54] SIMPLIFIED DUAL CONNECTION EP BRAKE SYSTEM

[75] Inventor: Angel P. Bezos, Rockwood, Md.

[73] Assignee: Westinghouse Air Brake Company, Wilmerding, Pa.

[21] Appl. No.: 835,859

[22] Filed: Apr. 8, 1997

[51] Int. Cl.[6] .................................................. B61C 17/12
[52] U.S. Cl. ........................... 307/9.1; 307/10.1; 307/36; 191/11; 191/2; 303/3; 303/15; 303/16; 303/17
[58] Field of Search ..................... 307/9.1, 10.1, 307/11, 31, 36, 38, 42, 15; 191/11, 2; 303/3, 15, 16, 17; 340/652; 439/33, 34

[56] References Cited

U.S. PATENT DOCUMENTS

| | | | |
|---|---|---|---|
| 514,303 | 2/1894 | Cattori | 191/11 |
| 526,963 | 10/1894 | Cattori | 191/11 |
| 2,564,121 | 8/1951 | Melcher | 307/9.1 |
| 2,703,345 | 3/1955 | Pestarini | 191/11 |
| 3,094,604 | 6/1963 | Van Der Sluys et al. | 307/9.1 |
| 3,868,909 | 3/1975 | Pelabon | 307/9.1 |
| 4,041,324 | 8/1977 | Tashiro et al. | 307/9.1 |
| 4,792,703 | 12/1988 | Koyama | 307/9.1 |
| 4,795,859 | 1/1989 | Kato et al. | 191/11 |
| 5,399,909 | 3/1995 | Young | 307/9.1 |
| 5,538,331 | 7/1996 | Kettle, Jr. | 303/15 |
| 5,630,565 | 5/1997 | Lumbis | 303/3 |

*Primary Examiner*—Richard T. Elms
*Assistant Examiner*—Peter Ganjian
*Attorney, Agent, or Firm*—James Ray & Associates

[57] ABSTRACT

A simplified dual connection system electrically interconnects the vehicles of a train. The train features a trainline to be formed through series interconnection of a wire on each vehicle. The simplified dual connection system includes a central computer, a connector control device on each vehicle and a pair of mateable connectors between each pair of vehicles of the train. Each pair of mateable connectors electrically interconnects the wires of each pair of adjacently disposed vehicles to form the trainline. When the mateable connectors are mated, a primary electrical path and a redundant electrical path are formed in that pair of connectors for the trainline. Each connector has a bidirectional circuit that interconnects a main node and a backup node for the wire on the vehicle. When a pair of connectors is mated, the main nodes of that pair interconnect to form the primary electrical path of the trainline and the backup nodes of that pair interconnect to form part of the redundant electrical path of the trainline. The redundant electrical path thus provides an electrical connection redundant to the primary electrical path to which it corresponds. The connector control device in each vehicle determines the integrity of the primary electrical path in the pair of mated connectors. The central computer receives from each connector control device the results of that determination and reports those results to a train operator.

25 Claims, 3 Drawing Sheets

SIMPLIFIED DUAL CONNECTION EP BRAKE SYSTEM

CROSS-REFERENCE TO RELATED APPLICATIONS

This application is related to copending application Ser. No. 08/835,860 entitled DUAL CONNECTION EP BRAKE SYSTEM. That copending application shares with the present application the same filing date, Apr. 8, 1997. That copending application is assigned to the assignee of the present invention, and its teachings are incorporated into the present document by reference.

FIELD OF THE INVENTION

The present invention generally relates to a system for electrically interconnecting the rail vehicles of a train. More particularly, the present invention pertains to a simplified dual connection system which features both a primary and a redundant electrical path for each electrical line interconnected between adjacently disposed rail vehicles. Even more particularly, the present invention pertains to a means of determining whether the primary electrical paths have failed and of reporting the results of that determination to an operator of the train.

BACKGROUND OF THE INVENTION

Most brake control systems used in the train industry today are electropneumatic in nature. These electropneumatic brake control systems consist of pneumatic and electropneumatic components and other related mechanical apparatus controlled by a centrally located electronic brake control unit. Though electropneumatic brake control systems feature the electronic brake control unit, the brakes of trains so equipped are still applied and release pneumatically via brake cylinder control valves and brake cylinders. Entirely electronic brake control systems, however, should eventually be developed. These will control electrical brake components such as electrical motors that will apply and release the train brakes electrically without the need of pneumatic backup systems.

It is well known that electronic systems are generally capable of processing and responding more quickly to a greater variety of input parameters than equivalent, though outmoded, mechanical systems. Electronic systems also typically require less physical space to implement than the bulky mechanical hardware that they replace. This factor yields a reduction in weight and an increase in available space thereby making trains so equipped more fuel efficient and capable of transporting more cargo and passengers. Electronic systems also exhibit greater reliability and thus require less physical maintenance than mechanically implemented systems.

A typical train includes at least one locomotive, one or more rail vehicles and a plurality of trainlines. The trainlines include both pneumatic and electrical lines which generally run from a head of train locomotive to a last rail vehicle in the train. These pneumatic and electrical trainlines connect to pneumatically controlled brakes and electrical devices, respectively, in each of the rail vehicles. In a locomotive, the pneumatic trainlines include an actuating pipe, a main reservoir equalizing (MER) pipe, and an independent application and release (IAR) pipe. Within a locomotive consist (i.e., two or more locomotives interconnected), each of the MER, actuating and IAR pipes respectively interconnect with the MER, actuating and IAR pipes of the other locomotives. These are the pipes that serve to supply air to each of the pneumatically controlled brake components situated on each of the locomotives.

The pneumatic trainlines also include a brake pipe whose pressure mimics pressure within a storage tank called an equalization reservoir. The brake pipe consists of a series of individual pipes interconnected serially. Usually secured to the underside of each rail vehicle, each individual pipe is interconnected to another such individual pipe via a flexible coupler situated between each rail vehicle. Connected to the equalization reservoir, the brake pipe is thus one long continuous pipe run from the head of train locomotive to the last rail vehicle. It is the brake pipe that connects and supplies air to each of the pneumatically controlled brake components situated on each of the rail vehicles.

The electrical trainlines generally include a power line, a return line and various control lines along with any number of other electrical lines. As with the brake pipe, each electrical trainline actually constitutes a series of individual wires interconnected serially. Typically secured to the underside of each rail vehicle within a separate protective conduit, each individual wire is interconnected to another individual wire to which it corresponds via a connector situated between each rail vehicle to form one of the electrical trainlines of the train. These separate protective conduits are thus interconnected serially to form a protective cable that runs from the head of train locomotive to the last rail vehicle. Though actually formed from a series of interconnected protective conduits, this protective cable is often itself referred to as "the electrical trainline" even though it actually houses multiple electrical trainlines.

The typical locomotive has an electropneumatic brake control system such as WABCO EPIC® Brake Equipment. Such a brake control system generally includes an electronic brake control unit for controlling overall operation of the brakes; a cab station unit for providing various inputs to the brake control unit including the positions of the automatic and independent brake handles through which to control the brakes on the entire train and the locomotive(s), respectively; a keyboard for accessing the brake equipment including providing certain set-up parameters; a display for monitoring brake equipment operation; a locomotive interface unit for connecting both electrical power and the electrical trainlines to the brake equipment; and a pneumatic operating unit having solenoid valves for controlling pressures in the pneumatic trainlines and in the reservoirs so as to control the brakes pneumatically according to commands received from the brake control unit.

These electropneumatic brake control systems are designed so that failure of any one of the pneumatic interconnections between any of the rail vehicles (or any other failure causing a loss of pressure in the pneumatic pipes) guarantees an emergency application of the brakes on all the vehicles of the train. Such electronic control of pneumatic braking componentry as well as the pneumatic componentry itself has proven quite dependable. Consequently, emergency brake applications occur quite infrequently given the reliability of current electropneumatic brake control systems and their associated pneumatic componentry and interconnections.

One of the foremost technical obstacles to overcome in the development of a completely electronically controlled brake system is the need for a reliable system for electrically interconnecting each of the aforementioned electrical brake components that will be situated on each of the rail vehicles. In such a system, a brake control cable containing one or more electrical lines will be used to transmit brake control signals from the brake control unit to each of the electrical brake components on each of the rail vehicles.

The brake control cable will run from the head of train locomotive to the last rail vehicle in the train. Analogous to the segmented brake pipe of contemporary electropneumatic brake control systems, the brake control cable will consist of a series of individual electrical conduits. Secured to the underside of each rail vehicle, each individual conduit will be interconnected to another individual conduit via a connector device situated between each rail vehicle to form the brake control cable. Originating in the brake control unit, these control signals will be used to command the electrical brake components to apply and release the train brakes electrically. If implemented on a freight train, which often consists of one hundred or so rail vehicles, such a completely electronic system would require as many connectors, especially if a one line brake control system is envisioned. The completely electronic system could even require double as many connectors or more depending on the design of the brake control conduit; two connectors, for example, could be employed to interconnect the rail vehicles in a two line system. Failure of the electrical connections between just one pair of adjacently disposed rail vehicles in such a system would give rise to an emergency brake application, a prospect that both train operator and customer fervently hope to avoid. Thus, the reliability of the electrical connectors in an entirely electronic brake control system is of paramount importance.

Many individuals in the railway industry contend that a completely electronically controlled brake system would be neither sufficiently reliable nor economically feasible when compared to contemporary electropneumatic brake control systems. The likelihood of connector failures in a completely electronic brake control system is said to be too great. This persuades some that brake control systems will always require some pneumatic componentry as back up to whatever type of electronics that would be employed in such a system.

The present invention addresses the aforementioned obstacles to the development of a completely electronic brake control system. Akin to the couplers used to interconnect the individual pipes serially to form the brake pipe of contemporary electropneumatic brake control systems, the present invention provides a simplified dual connection system for interconnecting the electronic brake components between each of the rail vehicles so as to form one variant of the aforementioned brake control cable. Featuring a pair of electrical paths for each line to be interconnected between rail vehicles and a means of determining the integrity of same, the present invention will provide highly reliable electrical connections for use with the entirely electronic brake control systems of the future. It should be apparent after reading this document that the present invention could also be adapted to any number of other electrical applications, even those unrelated to railway industry applications. Obvious modifications may be necessary, though, depending upon the specific application in which the present invention is employed.

It should be noted that the foregoing background information is provided to assist the reader in understanding the present invention. Accordingly, any terms used herein are not intended to be limited to any particular narrow interpretation unless specifically stated otherwise in this document.

SUMMARY OF THE INVENTION

In one simple embodiment, the present invention provides a simplified dual connection system for an electrical system of a train. The electrical system includes a power line and a return line each of which requiring electrical interconnection between serially interconnectable rail vehicles of the train. The simplified dual connection system includes a mateable connector at each end of each of the vehicles through which the electrical system interconnects serially from a head of train vehicle successively to an end of train vehicle. Each mateable connector has a pair of bidirectional circuits. Each bidirectional circuit interconnects a main node and a backup node for each such line disposed on the vehicle such that one of the main nodes affixes to the power line and the other of the main nodes affixes to the return line disposed on the vehicle. Each bidirectional circuit also includes a pair of oppositely directed diodes connected in parallel between the main node and the backup node such that one diode allows current flow in a direction opposing that allowed by the other diode upon failure of the primary electrical path. When a pair of mateable connectors are mated, the main nodes affixed to the power line electrically communicate as a primary electrical path for the power line and the backup nodes corresponding thereto electrically communicate as part of a redundant electrical path for the power line. Likewise, the main nodes affixed to the return line electrically communicate as a primary electrical path for the return line and the backup nodes corresponding thereto electrically communicate as part of a redundant electrical path for the return line. With a pair of mateable connectors interconnecting each of the rail vehicles, each of the redundant electrical paths provides an electrical connection redundant to the primary electrical path corresponding thereto thereby providing the electrical system with more reliable electrical connections. The simplified dual connection system also includes a connector control means in each of the vehicles. The connector control means in each vehicle determines the integrity of the primary electrical path in the pair of mated connectors. The central computer receives from each connector control means the results of that determination and reports those results to a train operator.

OBJECTIVES OF THE INVENTION

It is, therefore, a primary objective of the present invention to provide a simplified dual connection system for electrically interconnecting the electronic brake components of a completely electronic brake control system of a train.

Another objective of the present invention is to provide a simplified dual connection system having a primary and a redundant electrical path for each electrical line to be interconnected between each of the adjacently disposed rail vehicles of a train so that for each primary electrical path that has failed the redundant electrical path to which it corresponds electrically bypasses and functions in place of the affected primary electrical path.

Yet another objective of the present invention is to provide a simplified dual connection system that has a primary and a redundant electrical path for each electrical line to be interconnected between each of the adjacently disposed rail vehicles of a train and that is capable of determining whether any of the primary electrical paths have failed and of reporting the results of that determination to an operator of the train.

In addition to these objectives and advantages, various other objectives and advantages will become more readily apparent to persons skilled in the electrical connector art from a reading of the detailed description section of this document. The other objectives and advantages will become particularly apparent when the detailed description is considered in conjunction with the attached drawings and with the appended claims.

DETAILED DESCRIPTION OF THE INVENTION

Before describing the present invention in detail, the reader is advised that, for the sake of clarity and understanding, identical components having identical functions in each of the accompanying drawings have been marked where possible with the same reference numerals in each of the Figures provided in this document.

Figure 1:
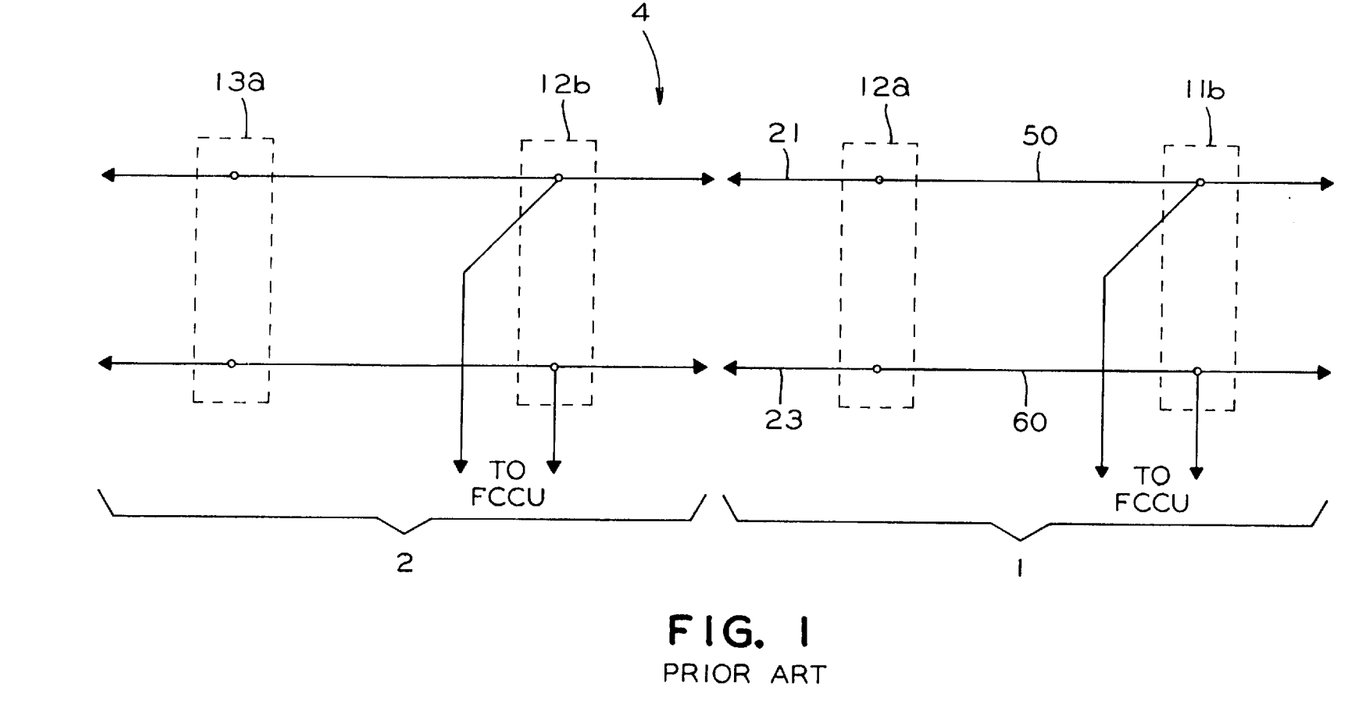
FIG. 1 is a schematic view of a prior art connection scheme through which two lines of a two line electrical system are interconnected between a pair of adjacently disposed rail vehicles.

Referring now to the drawings, FIG. 1 illustrates a schematic view of a prior art connection scheme, generally designated 4, through which electrical lines 50 and 60 of an electrical system (not shown) are interconnected between a pair of adjacently disposed rail vehicles 1 and 2 of a train. Though any number of lines of one or more electrical systems may be interconnected in the manner shown, a two line electrical system has been arbitrarily selected as such systems typically bear dedicated power 50 and return 60 electrical lines and are, of course, easily illustrated. The power and return lines 50 and 60 each require electrical interconnection between the serially interconnectable rail vehicles 1 and 2 of the train so as to supply power to the various electrical and electronic systems situated on each of the rail vehicles. The prior art connection scheme 4 includes a typical mateable connector (e.g., 11b, 12a, 12b and 13a) at each end of each of the rail vehicles through which the electrical system interconnects serially from a head of train vehicle successively to an end of train vehicle. The head of train vehicle typically contains the power source for the electrical system. When adjacently disposed rail vehicles are electrically interconnected, power is supplied to each of the rail vehicles through the power line 50, with the return line 60 completing the electrical circuit. Each pair of adjacently disposed rail vehicles (e.g., pair 1 and 2) is therefore interconnected electrically through two electrical paths 21 and 23. One electrical path 21 connects the power line 50 between each pair of adjacently disposed rail vehicles (e.g., pair 1 and 2) while another electrical path 23 so connects the return line 60. Failure of just one of the electrical paths 21 and 23 between just one pair of adjacently disposed rail vehicles could give rise to a serious problem depending upon the type of electrical system interconnected by the prior art connection scheme. For example, if the prior art connection scheme were to be used with the aforementioned completely electronic brake control system, failure of just one of the electrical paths between just one pair of adjacently disposed rail vehicles would require an emergency brake application, an outcome that is most undesirable. The present invention was developed to address such problems.

Figure 2:
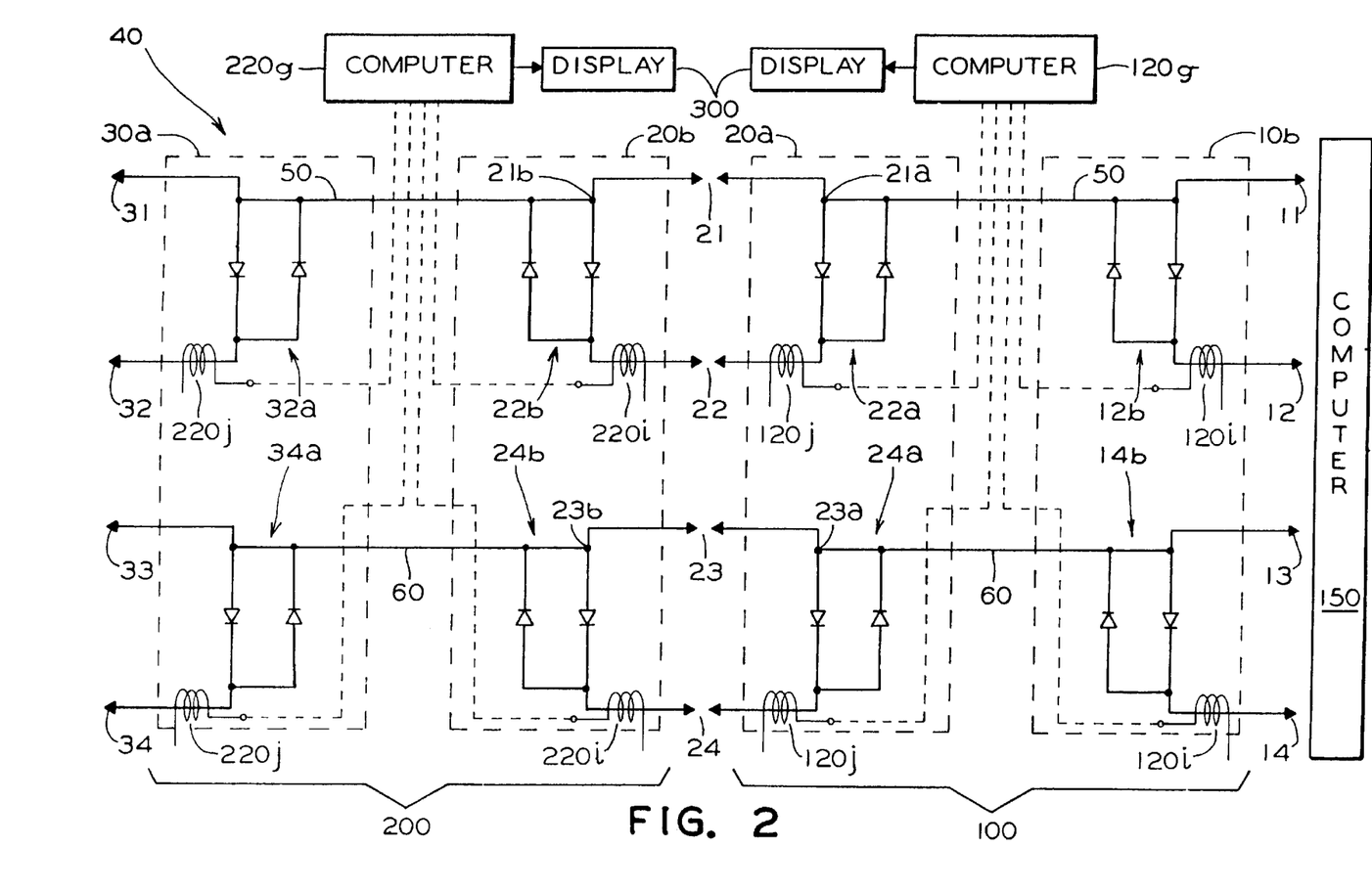
FIG. 2 is a partial schematic view of a first embodiment of the present invention illustrating a pair of mateable connectors interconnecting the two lines of a two line electrical system between a pair of adjacently disposed rail vehicles.
Figure 3:
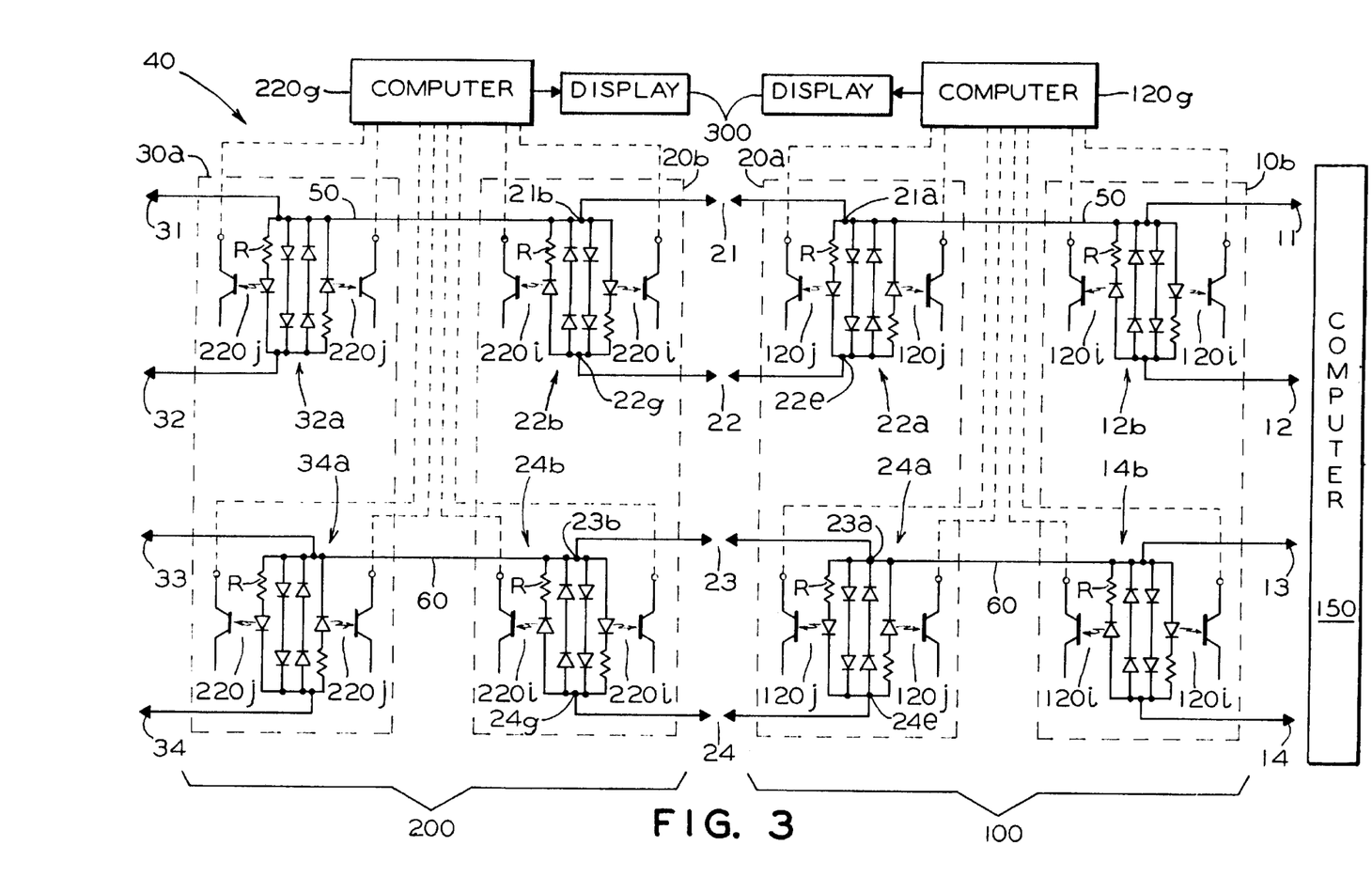
FIG. 3 is a partial schematic view of a second embodiment of the present invention illustrating a pair of mateable connectors interconnecting the two lines of a two line electrical system between a pair of adjacently disposed rail vehicles.

FIGS. 2 and 3 illustrate the essential details of two presently preferred embodiments of the simplified dual connection system. Referring first to FIG. 2, the present invention, generally designated 40, provides a simplified dual connection system 40 for an electrical system (not shown) of a train. The electrical system has a power line 50 and a return line 60 each of which requiring electrical interconnection between serially interconnectable rail vehicles (e.g., 100 and 200) of the train. The simplified dual connection system 40 includes a mateable connector at each end of each of the rail vehicles through which the electrical system interconnects serially from a head of train vehicle successively to an end of train vehicle. For example, as shown in FIG. 2, vehicle 100 has mateable connector 10b at one end and mateable connector 20a at the other end while vehicle 200 has mateable connectors 20b and 30a at opposite ends.

Each mateable connector has a pair of bidirectional circuits in this two wire electrical system. Each bidirectional circuit interconnects a main node and a backup node for each such electrical line disposed on each rail vehicle. Each bidirectional circuit also includes a pair of oppositely directed diodes connected in parallel between the main node and the backup node. It should be apparent that the diodes in each bidirectional circuit are oppositely directed because rail vehicles are typically bidirectional, that is they may be serially inserted into a train without concern as to which end is to point towards the front or rear of the train.

Referring to mateable connector 20a, for example, main node 21a affixes to power line 50 and the other main node 23a affixes to return line 60 disposed on rail vehicle 100. Bidirectional circuit 22a interconnects main node 21a with backup node 22e via one pair of oppositely directed diodes. Bidirectional circuit 24a interconnects main node 23a with backup node 24e via another pair of oppositely directed diodes. Likewise, mateable connector 20b shows main node 21b affixed to power line 50 and the other main node 23b affixed to return line 60 disposed on rail vehicle 200. Bidirectional circuit 22b interconnects main node 21b with backup node 22g via one pair of oppositely directed diodes. Bidirectional circuit 24b interconnects main node 23b with backup node 24g via another pair of oppositely directed diodes.

Mateable connectors 10b and 30a are essentially identical to mateable connectors 20a and 20b, though the reference numerals assigned to their components differ so as to avoid confusion in describing the present invention 40. When a pair of mateable connectors such as connectors 20a and 20b are mated, the main nodes 21a and 21b affixed to power line 50 in vehicles 100 and 200, respectively, electrically communicate as a primary electrical path 21 for power line 50. The backup nodes 22e and 22g respectively corresponding to main nodes 21a and 21b electrically communicate as part of a redundant electrical path 22 for power line 50. Likewise, the main nodes 23a and 23b affixed to return line 60 in vehicles 100 and 200, respectively, electrically communicate as a primary electrical path 23 for return line 60. The backup nodes 24e and 24g respectively corresponding to main nodes 23a and 23b electrically communicate as part of redundant path 24 for return line 60.

FIG. 2 shows that each bidirectional circuit is also part of a redundant electrical path. When connectors 20a and 20b are mated to form connector pair 20, for example, current carried along power line 50 would normally flow through primary electrical path 21 due to the presence of the diodes in redundant electrical path 22. Should primary electrical path 21 fail open, however, (assuming current is flowing from vehicle 100 to vehicle 200) current would then flow from power line 50 in vehicle 100 through one diode of bidirectional circuit 22a through line 22 through one diode of bidirectional circuit 22b to power line 50 in rail vehicle 200. Likewise, current carried along return line 60 would normally flow through primary electrical path 23 due to the presence of the diodes in redundant electrical path 24. Should primary electrical path 23 fail open, (assuming current is flowing from vehicle 200 to vehicle 100) current would then flow from return line 60 in vehicle 200 through one diode of bidirectional circuit 24b through line 24 through one diode of bidirectional circuit 24a to return line 60 in rail vehicle 100.

Each of the other rail vehicles of the train are electrically interconnected in the same manner as are rail vehicles 100 and 200. Rail vehicle 100, for example, would interconnect via mateable connector 10b to a previous rail vehicle, perhaps the head of train locomotive (not shown). Similarly, rail vehicle 200 would interconnect via mateable connector 30a to a subsequent rail vehicle, perhaps the end of train vehicle (not shown). With a pair of mateable connectors interconnecting each of the rail vehicles, each of the redundant electrical paths provides an electrical connection redundant to the primary path corresponding thereto. This provides the electrical system with more reliable electrical connections.

The simplified dual connection system 40 also includes a connector control means in each of the rail vehicles of the train. Each connector control means, generally designated 120 and 220 in FIG. 2, includes a current sensing means and a vehicle computer. The vehicle computer preferably connects via electrical lines to a centrally located computer 150. The electrical lines can, of course, be the same as the power and return lines discussed herein.

It may be preferred to have the locomotive computer serve as the central computer 150 of the present system 40. The locomotive computer, however, would have to be provided with a programming means to enable it to perform, in addition to its locomotive functions, the functions attributed to central computer 150. Likewise, if each rail vehicle is already equipped with a computer, each of these preexisting computers may serve as the vehicle computers. Each preexisting computer, however, would have to be provided with a vehicle programming means to enable it to perform, in addition to its standard functions, the functions attributed to the vehicle computer.

Rail vehicle 200 as shown in FIG. 2, for example, has connector control means 220. Connector control means 220 includes a vehicle computer 220g and current sensors 220i. The current sensors 220i are preferably situated as shown in FIG. 2. Specifically, one current sensor 220i is connected to sense whether current is flowing through redundant electrical path 22 of power line 50 of connector pair 20. The other current sensor 220i is connected to sense whether current is flowing through redundant electrical path 24 of return line 60 of connector pair 20. The vehicle computer 220g connects to the current sensors 220i as indicated.

Each of the connector control means of the other rail vehicles of the train are disposed in the same manner as connector control means 220 of rail vehicle 200. Connector control means 120 of rail vehicle 100, for example, includes a vehicle computer 120g and current sensors 120i. One current sensor 120i is connected to sense whether current is flowing through a redundant electrical path 12 (not completely shown) of power line 50 of connector pair 10 (not completely shown). The other current sensor 120i is connected to sense whether current is flowing through a redundant electrical path 14 (not completely shown) of return line 60 of connector pair 10 (not completely shown). Each of the current sensors 120i connect to the vehicle computer 120g as indicated.

It should be apparent that the other current sensors shown in FIG. 2 are not necessarily needed, though they could be used to increase the reliability of the present invention 40. Only one current sensor, of course, is needed to sense whether current is flowing in any one redundant electrical path. Should these extra current sensors be used, they would be employed as indicated in the drawings and used in the manner provided in this document.

The simplified dual connection system 40 may be placed into a test mode of operation through central computer 150. The present invention 40 may be operated continuously in the test mode while the train is operating. Alternatively, the present system 40 may placed into the test mode only automatically according to some predetermined criteria or at the instance of a train operator. Should it be desired to run the test mode infrequently as possible, the test mode is then preferably run only prior to the train departing from a stop.

While operating in the test mode, central computer 150 may control each of the connector control means so that each of the redundant electrical paths in each connector pair is tested to determine whether it carries current. The connector pairs may be tested either sequentially from the head of train vehicle to the end of train vehicle or according to some other criteria.

For the purposes of illustration only, the test mode of the simplified dual connection system 40 will now be described as following a sequential test pattern. Specifically, the central computer 150 could start the test mode by ordering the connector control means of the first rail vehicle to detect whether current is flowing through the redundant electrical paths between the head of train locomotive and the first rail vehicle. Once the first connector control means reports to central computer 150 the status of the connections between the head locomotive and the first rail vehicle, the central computer 150 orders the connector control means of the second rail vehicle to detect whether current is flowing through the redundant electrical paths between the first and the second rail vehicles. This process is repeated until all of the connections between the rail vehicles have been tested. Generally, at least one path for each electrical line interconnected between rail vehicles must be viable to allow proper testing of the connections between subsequent rail vehicles.

Regarding the functions of a specific connector control means, the reader is directed to connector control means 220 shown in FIG. 2. One current sensor 220i is used to sense whether current is flowing in redundant electrical path 22. The other current sensor 220i is used to sense whether current is flowing in redundant electrical path 24. Depending on how one wishes to configure the present system 40, vehicle computer 220g may check the current sensors 220i either unilaterally or in response to an appropriate command received from central computer 150. Vehicle computer 220g may even be used to command the current sensors 220i when to sense the current flowing in the redundant electrical paths.

Notwithstanding the sequential test pattern option previously mentioned, each vehicle computer may just report to central computer 150 only when one or more of its redundant electrical paths carry current. This, of course, would occur only when a primary electrical path has failed. Should the central computer 150 receive a report of such failure from one or more of the vehicle computers, central computer 150 would then inform the train operator of same. The train operator can then take the appropriate corrective action.

Referring now to the second embodiment of the present invention illustrated in FIG. 3, the bidirectional circuits are what chiefly distinguish this second embodiment from the first embodiment. Like the first embodiment, each mateable connector in the second embodiment has a pair of bidirectional circuits in this two wire electrical system. Each bidirectional circuit still interconnects a main node and a backup node for each electrical line on each vehicle.

Each bidirectional circuit includes a pair of oppositely directed diode circuits connected in parallel between the main node and the backup node. Each bidirectional circuit also includes a pair of oppositely directed optoisolator means connected in parallel between the main node and the backup node. The diode circuits and optoisolator means in each bidirectional circuit are oppositely directed because rail vehicles are typically bidirectional and therefore may be serially inserted into a train without concern as to which end is to point towards the front or rear of the train.

Referring to mateable connector 20a, for example, main node 21a affixes to power line 50 and the other main node 23a affixes to return line 60 on rail vehicle 100. Bidirectional circuit 22a interconnects main node 21a with backup node 22e via one pair of oppositely directed diode circuits and one pair of oppositely directed optoisolator means. Bidirectional circuit 24a interconnects main node 23a with backup node 24e via another pair of oppositely directed diode circuits and another pair of oppositely directed optoisolator means. Likewise, mateable connector 20b shows main node 21b affixed to power line 50 and the other main node 23b affixed to return line 60 on rail vehicle 200. Bidirectional circuit 22b interconnects main node 21b with backup node 22g via one pair of oppositely directed diode circuits and one pair of oppositely directed optoisolator means. Bidirectional circuit 24b interconnects main node 23b with backup node 24g via another pair of oppositely directed diode circuits and another pair of oppositely directed optoisolator means.

Mateable connectors 10b and 30a are essentially identical to mateable connectors 20a and 20b, though the reference numerals assigned to their components differ so as to avoid confusion in describing the present invention 40. When a pair of mateable connectors such as connectors 20a and 20b are mated, the main nodes 21a and 21b affixed to power line 50 in vehicles 100 and 200, respectively, electrically communicate as a primary electrical path 21 for power line 50. The backup nodes 22e and 22g respectively corresponding to main nodes 21a and 21b electrically communicate as part of a redundant electrical path 22 for power line 50. Likewise, the main nodes 23a and 23b affixed to return line 60 in vehicles 100 and 200, respectively, electrically communicate as a primary electrical path 23 for return line 60. The backup nodes 24e and 24g respectively corresponding to main nodes 23a and 23b electrically communicate as part of redundant path 24 for return line 60.

FIG. 3 shows that each bidirectional circuit is also part of a redundant electrical path. When connectors 20a and 20b are mated to form connector pair 20, for example, current carried along power line 50 would normally flow through primary electrical path 21 due to the presence of the diodes in redundant electrical path 22. Should primary electrical path 21 fail open, however, (assuming current is flowing from vehicle 100 to vehicle 200) current would then flow from power line 50 in vehicle 100 though redundant electrical path 22 to power line 50 in rail vehicle 200. Specifically, when primary path 21 fails, one of the diode circuits in bidirectional circuit 22a causes a voltage drop across nodes 21a and 22e thereby activating the corresponding optoisolator means in bidirectional circuit 22a. A diode circuit in bidirectional circuit 22b likewise causes a voltage drop across nodes 21b and 22g thereby activating the corresponding optoisolator means in bidirectional circuit 22b.

Likewise, current carried along return line 60 would normally flow through primary electrical path 23 due to the presence of the diodes in redundant electrical path 24. Should primary electrical path 23 fail open (assuming current is flowing from vehicle 200 to vehicle 100), current would then flow from return line 60 in vehicle 200 though redundant electrical path 24 to return line 60 in rail vehicle 100. Specifically, when primary path 23 fails, one of the diode circuits in bidirectional circuit 24b causes a voltage drop across nodes 23b and 24g thereby activating the corresponding optoisolator means in bidirectional circuit 24b. A diode circuit in bidirectional circuit 24a causes a voltage drop across nodes 23a and 24e thereby activating the corresponding optoisolator means in bidirectional circuit 24a.

The simplified dual connection system 40 also includes a connector control means in each of the rail vehicles of the train. Each connector control means, designated 120 and 220 in FIG. 3, generally includes one pair of oppositely directed optoisolator means and a vehicle computer. The vehicle computer preferably connects via electrical lines to a centrally located computer 150. The electrical lines can be the same as the power and return lines discussed herein.

For the reasons provided in the description of the first embodiment of the present invention, it may be preferred to have the locomotive computer serve as the central computer 150. Likewise, if each rail vehicle is already equipped with a computer, each of these preexisting computers may serve as the vehicle computers.

Each optoisolator means may take the form of any one of a variety of commercially available chips or circuit designs well known in the electronic arts. A solid state optocoupler device is one such chip that is widely available. It provides electrical isolation by converting the current flowing through the redundant electrical path to light and reconverting the light to an electrical signal. It is this electrical signal that is detectable by the vehicle computer.

Rail vehicle 200 as shown in FIG. 3 has connector control means 220. Connector control means 220 includes a vehicle computer 220g and optoisolator means 220i. The optoisolator means 220i are preferably situated as shown in FIG. 3. Specifically, one optoisolator means 220i is connected to sense whether current is flowing in one direction through redundant path 22 of power line 50 of connector pair 20. Another optoisolator means 220i is connected to sense whether current is flowing in the other direction through redundant path 22. Likewise, one optoisolator means 220i is connected to sense whether current is flowing in one direction through redundant path 24 of return line 60 of connector pair 20. Yet another optoisolator means 220i is connected to sense whether current is flowing in the other direction through redundant path 24. The vehicle computer 220g connects to each optoisolator means 220i as indicated. Each of the connector control means of the other rail vehicles of the train are disposed in the same manner as connector control means 220 of rail vehicle 200.

It should be apparent that the other optoisolator means shown in FIG. 3 are not necessarily needed, though they could be used to increase the reliability of the present invention 40. Should these extra optoisolator means be used, they would be employed as indicated in the drawings and used in the manner provided in this document. It should also be apparent that this second embodiment of the present invention 40 may be operated in the test mode in much the same manner as the first embodiment previously described.

It is preferred that the present invention 40 incorporate the centrally located computer 150 shown in FIGS. 2 and 3, as alluded to previously. The present invention 40, however, could work without resort to such a centrally located computer. Each connector control means, for example, need not have its vehicle computer report to a central computer when a primary path of a connector pair has failed. Each connector control means could merely convey such connector status information to its own display on the rail vehicle. Each connector control means could display such information at the rail vehicle level rather than conveying it to a central location such as the central computer previously described. FIGS. 2 and 3 thus each illustrate a display 300 on each of the rail vehicles.

The simplified dual connection system 40 has been described in this document merely in terms of serially interconnecting an electronic brake control system between the rail vehicles of a train. It may, however, also be used to link the serially interconnectable parts of a variety of other types of electrical systems.

While the presently preferred embodiments for carrying out the instant invention have been set forth in detail according to the Patent Act, those persons of ordinary skill in the technical art to which this invention pertains will recognize various alternative ways of practicing the invention without departing from the spirit and scope of the appended claims. Those of ordinary skill will also recognize that the foregoing description is merely illustrative and is not intended to limit any of the following claims to any particular narrow interpretation.

Accordingly, to promote the progress of science and useful arts, I secure for myself by Letters Patent exclusive rights to all subject matter embraced by the following claims for the time prescribed by the Patent Act.

I claim:

1. A dual connection system for electrically interconnecting vehicles of a train, said train featuring a trainline to be formed through series interconnection of a wire on each said vehicle, said dual connection system comprising:
    (a) a pair of mateable connectors for electrically interconnecting said wires of each pair of adjacently disposed vehicles to form said trainline such that both a primary electrical path and a redundant electrical path are formed for said trainline when said pair of connectors are mated, each of said connectors having a bidirectional circuit that interconnects a main node and a backup node for said wire on said vehicle so that when said connectors are mated, said main nodes of said pair of connectors interconnect to form said primary electrical path of said trainline and said backup nodes of said pair of connectors interconnect to form part of said redundant electrical path of said trainline so that said redundant electrical path provides an electrical connection redundant to said primary electrical path corresponding thereto;
    (b) a connector control means in each said vehicle for determining integrity of said primary electrical path for said trainline formed by mating of said pair of connectors; and
    (c) a central computer for receiving from each of said connector control means results of said determination and for reporting said results to an operator of said train.

2. The dual connection system as recited in claim 1 wherein said bidirectional circuit includes a pair of oppositely directed diodes connected in parallel between said main node and said backup node such that one of said diodes allows current flow in a direction opposing that allowed by the other of said diodes upon failure of said primary electrical path.

3. The dual connection system as recited in claim 2 wherein said connector control means includes:
    (a) a current sensing means for sensing current flowing in said redundant electrical path of said trainline formed by mating of said pair of said connectors; and
    (b) a vehicle computer for monitoring said current sensing means to determine whether said primary electrical path formed by mating of said pair of connectors has failed and for reporting to said central computer said results of said determination.

4. The dual connection system as recited in claim 3 wherein said central computer is a locomotive computer which controls operation of a locomotive of said train such that a programming means provided to said locomotive computer enables said locomotive computer to perform the functions attributed to said central computer.

5. The dual connection system as recited in claim 4 wherein said vehicle computer is a preexisting computer which controls operation of said vehicle such that a vehicle programming means provided to said preexisting computer enables said preexisting computer to perform the functions attributed to said vehicle computer.

6. The dual connection system as recited in claim 1 wherein said bidirectional circuit includes:
    (a) a pair of oppositely directed optoisolator means connected in parallel between said main node and said backup node; and
    (b) a pair of oppositely directed diode circuits also connected in parallel between said main node and said backup node such that when said primary electrical path fails (i) current flow in one direction through said redundant electrical path causes one of said diode circuits to develop a voltage drop across said nodes thereby activating one of said optoisolator means and (ii) current flow in the other direction through said redundant electrical path causes the other of said diode circuits to develop a voltage drop across said nodes thereby activating the other of said optoisolator means.

7. The dual connection system as recited in claim 6 wherein said connector control means includes:
    (a) said pair of oppositely directed optoisolator means; and
    (b) a vehicle computer for detecting activation of either of said optoisolator means thereby determining whether said primary electrical path formed by mating of said pair of connectors has failed and for reporting to said central computer said results of said determination.

8. The dual connection system as recited in claim 7 wherein said central computer is a locomotive computer which controls operation of a locomotive of said train such that a programming means provided to said locomotive computer enables said locomotive computer to perform the functions attributed to said central computer.

9. The dual connection system as recited in claim 8 wherein said vehicle computer is a preexisting computer which controls operation of said vehicle such that a vehicle programming means provided to said preexisting computer enables said preexisting computer to perform the functions attributed to said vehicle computer.

10. The dual connection system as recited in claim 7 wherein said optoisolator means is an optocoupler chip.

11. A dual connection system for electrically interconnecting vehicles of a train, said train featuring a plurality of trainlines each of which to be formed through series interconnection of a wire on each said vehicle, said dual connection system comprising:

(a) a connector for each end of each of said vehicles such that when a pair of said vehicles are adjacently disposed to one another each pair of said connectors thereat is mateable to each other to form a primary electrical path and a redundant electrical path for each said trainline so formed, each of said connectors having for each said wire a bidirectional circuit that interconnects a main node and a backup node for each said wire so that when said pair of connectors are mated, said main nodes corresponding to each said trainline interconnect to form said primary electrical path for each said trainline and said backup nodes corresponding to each said trainline interconnect to form part of said redundant electrical path for each said trainline so that each of said redundant electrical paths provides an electrical connection redundant to said primary electrical path corresponding thereto;

(b) a connector control means in each said vehicle for determining integrity of said primary electrical path for each said trainline formed by mating of said pair of connectors; and (c) a central computer for receiving from each of said connector control means results of said determination and for reporting said results to an operator of said train.

12. The dual connection system as recited in claim 11 wherein each of said bidirectional circuits includes a pair of oppositely directed diodes connected in parallel between said main node and said backup node such that one of said diodes allows current flow in a direction opposing that allowed by the other of said diodes upon failure of said primary electrical path.

13. The dual connection system as recited in claim 12 wherein said connector control means includes:

(a) a current sensing means for sensing current flowing in said redundant electrical path of each said trainline formed by mating of said pair of connectors; and (b) a vehicle computer for monitoring said current sensing means to determine whether any of said primary electrical paths formed by mating of said pair of connectors have failed and for reporting to said central computer said results of said determination.

14. The dual connection system as recited in claim 13 wherein said central computer is a locomotive computer which controls operation of a locomotive of said train such that a programming means provided to said locomotive computer enables said locomotive computer to perform the functions attributed to said central computer.

15. The dual connection system as recited in claim 14 wherein said vehicle computer is a preexisting computer which controls operation of said vehicle such that a vehicle programming means provided to said preexisting computer enables said preexisting computer to perform the functions attributed to said vehicle computer.

16. The dual connection system as recited in claim 11 wherein each of said bidirectional circuits includes:

(a) a pair of oppositely directed optoisolator means connected in parallel between said main node and said backup node; and (b) a pair of oppositely directed diode circuits also connected in parallel between said main node and said backup node such that when said primary electrical path fails (i) current flow in one direction through said redundant electrical path causes one of said diode circuits to develop a voltage drop across said nodes thereby activating one of said optoisolator means and (ii) current flow in the other direction through said redundant electrical path causes the other of said diode circuits to develop a voltage drop across said nodes thereby activating the other of said optoisolator means.

17. The dual connection system as recited in claim 16 wherein said connector control means includes:

(a) said pair of oppositely directed optoisolator means; and (b) a vehicle computer for detecting activation of either of said optoisolator means thereby determining whether said primary electrical path formed by mating of said pair of connectors has failed and for reporting to said central computer said results of said determination.

18. The dual connection system as recited in claim 17 wherein said central computer is a locomotive computer which controls operation of a locomotive of said train such that a programming means provided to said locomotive computer enables said locomotive computer to perform the functions attributed to said central computer.

19. The dual connection system as recited in claim 18 wherein said vehicle computer is a preexisting computer which controls operation of said vehicle such that a vehicle programming means provided to said preexisting computer enables said preexisting computer to perform the functions attributed to said vehicle computer.

20. The dual connection system as recited in claim 17 wherein said optoisolator means is an optocoupler chip.

21. A dual connection system for electrically interconnecting vehicles of a train, said train featuring a plurality of trainlines each of which to be formed through series interconnection of a wire on each said vehicle, said dual connection system comprising:

(a) a connector for each end of each of said vehicles such that when a pair of said vehicles are adjacently disposed to one another each pair of said connectors thereat is mateable to each other to form a primary electrical path and a redundant electrical path for each said trainline so formed, each of said connectors having for each said wire a bidirectional circuit that interconnects a main node and a backup node for each said wire so that when said pair of connectors are mated, said main nodes corresponding to each said trainline interconnect to form said primary electrical path for each said trainline and said backup nodes corresponding to each said trainline interconnect to form part of said redundant electrical path for each said trainline so that each of said redundant electrical paths provides an electrical connection redundant to said primary electrical path corresponding thereto; and (b) a connector control means in each said vehicle for determining integrity of said primary electrical path for each said trainline formed by mating of said pair of connectors and for displaying results of said determination.

22. The dual connection system as recited in claim 21 wherein each of said bidirectional circuits includes a pair of oppositely directed diodes connected in parallel between said main node and said backup node such that one of said diodes allows current flow in a direction opposing that allowed by the other of said diodes upon failure of said primary electrical path.

23. The dual connection system as recited in claim 22 wherein said connector control means includes:

(a) a current sensing means for sensing current flowing in said redundant electrical path of each said trainline formed by mating of said pair of connectors;

(b) a vehicle computer for monitoring said current sensing means to determine whether any of said primary electrical paths formed by mating of said pair of connectors have failed; and (c) a display for displaying said results of said determination.

24. The dual connection system as recited in claim 21 wherein each of said bidirectional circuits includes:

(a) a pair of oppositely directed optoisolator means connected in parallel between said main node and said backup node; and (b) a pair of oppositely directed diode circuits also connected in parallel between said main node and said backup node such that when said primary electrical path fails (i) current flow in one direction through said redundant electrical path causes one of said diode circuits to develop a voltage drop across said nodes thereby activating one of said optoisolator means and (ii) current flow in the other direction through said redundant electrical path causes the other of said diode circuits to develop a voltage drop across said nodes thereby activating the other of said optoisolator means.

25. The dual connection system as recited in claim 24 wherein said connector control means includes:

(a) said pair of oppositely directed optoisolator means; and (b) a vehicle computer for detecting activation of either of said optoisolator means thereby determining whether said primary electrical path formed by mating of said pair of connectors has failed; and (c) a display for displaying said results of said determination.

* * * * *